(12) United States Patent
Huang et al.

(10) Patent No.: US 10,055,563 B2
(45) Date of Patent: Aug. 21, 2018

(54) AIR WRITING AND GESTURE SYSTEM WITH INTERACTIVE WEARABLE DEVICE

(71) Applicant: MediaTek Inc., Hsinchu (TW)

(72) Inventors: Yu-Hao Huang, Kaohsiung (TW); Chih-Kai Chang, Taichung (TW); Chun-Chia Chen, Hsinchu (TW); Tsu-Ming Liu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 172 days.

(21) Appl. No.: 15/074,003

(22) Filed: Mar. 18, 2016

(65) Prior Publication Data

US 2016/0203362 A1 Jul. 14, 2016

Related U.S. Application Data

(60) Provisional application No. 62/147,841, filed on Apr. 15, 2015.

(51) Int. Cl.

| G06F 21/00 | (2013.01) |
| G06F 21/32 | (2013.01) |
| G06F 3/01 | (2006.01) |
| G06F 1/16 | (2006.01) |
| G06F 3/00 | (2006.01) |
| G10L 17/08 | (2013.01) |
| G06F 21/31 | (2013.01) |
| G06K 9/00 | (2006.01) |
| G06K 9/62 | (2006.01) |
| G10L 15/22 | (2006.01) |

(52) U.S. Cl.
CPC .............. *G06F 21/32* (2013.01); *G06F 1/163* (2013.01); *G06F 3/005* (2013.01); *G06F 3/017* (2013.01); *G06F 21/316* (2013.01); *G06K 9/00355* (2013.01); *G06K 9/6288* (2013.01); *G10L 17/08* (2013.01); *G10L 2015/223* (2013.01)

(58) Field of Classification Search
CPC .............................. G06F 21/316; G06F 21/32
See application file for complete search history.

(56) References Cited

U.S. PATENT DOCUMENTS

| 8,223,024 | B1* | 7/2012 | Petrou | G02B 27/017 |
| | | | | 340/539.13 |
| 9,111,085 | B1* | 8/2015 | Darmour | G06F 21/34 |
| 9,612,862 | B2* | 4/2017 | Faaborg | G06F 9/46 |
| 9,700,799 | B2* | 7/2017 | Millegan | A63F 13/98 |
| 9,704,250 | B1* | 7/2017 | Shah | G06T 7/0065 |
| 2013/0194066 | A1* | 8/2013 | Rahman | G05B 1/01 |
| | | | | 340/5.51 |
| 2013/0208926 | A1* | 8/2013 | Vincent | H04S 7/303 |
| | | | | 381/300 |
| 2013/0271389 | A1* | 10/2013 | Lyons | G04G 17/083 |
| | | | | 345/173 |

(Continued)

*Primary Examiner* — Ali Shayanfar
(74) *Attorney, Agent, or Firm* — Han IP Corporation; Andy M. Han

(57) ABSTRACT

A wearable device interactive system and techniques, methods and apparatuses thereof are described. A wearable device may sense a movement by a user wearing the wearable device. The wearable device may also determine whether a path of the movement corresponds to one or more predefined patterns. The wearable device may further perform one or more operations in response to a determination that the path of the movement corresponds to at least one of the one or more predefined patterns.

31 Claims, 8 Drawing Sheets

(56) References Cited

U.S. PATENT DOCUMENTS

| | | | | |
|---|---|---|---|---|
| 2014/0340997 | A1* | 11/2014 | Rahman | G04G 21/02 |
| | | | | 368/10 |
| 2014/0366128 | A1* | 12/2014 | Venkateswaran | H04L 63/08 |
| | | | | 726/19 |
| 2015/0120553 | A1* | 4/2015 | Li | H04M 1/72522 |
| | | | | 705/44 |
| 2015/0135284 | A1* | 5/2015 | Bogard | G06F 21/35 |
| | | | | 726/5 |
| 2015/0137994 | A1* | 5/2015 | Rahman | H04Q 9/04 |
| | | | | 340/870.07 |
| 2015/0149310 | A1* | 5/2015 | He | G06Q 20/322 |
| | | | | 705/21 |
| 2015/0161998 | A1* | 6/2015 | Park | G10L 25/78 |
| | | | | 704/231 |
| 2015/0261946 | A1* | 9/2015 | Yoon | G06F 21/34 |
| | | | | 726/19 |
| 2015/0261947 | A1* | 9/2015 | Motoe | G06F 21/35 |
| | | | | 726/19 |
| 2015/0370597 | A1* | 12/2015 | Faaborg | G06F 9/46 |
| | | | | 718/102 |
| 2016/0143079 | A1* | 5/2016 | Yoon | G06F 3/0346 |
| | | | | 455/41.1 |
| 2016/0225068 | A1* | 8/2016 | Yang | G06Q 30/08 |
| 2017/0011210 | A1* | 1/2017 | Cheong | H04W 12/06 |
| 2017/0199543 | A1* | 7/2017 | Rhee | G06F 1/1605 |

* cited by examiner

AIR WRITING AND GESTURE SYSTEM WITH INTERACTIVE WEARABLE DEVICE

CROSS REFERENCE TO RELATED PATENT APPLICATION

The present disclosure claims the priority benefit of U.S. Provisional Patent Application No. 62/147,841, filed on 15 Apr. 2015, which is incorporated by reference in its entirety.

TECHNICAL FIELD

The present disclosure is generally related to wearable devices and, more particularly, to an air writing system in interactive wearable devices.

BACKGROUND

Unless otherwise indicated herein, approaches described in this section are not prior art to the claims listed below and are not admitted to be prior art by inclusion in this section.

Wearable devices generally are devices that are clothing, apparels and/or accessories worn by a user and incorporating computer and/or advanced electronic technologies. Examples of wearable devices include smart watches, smart bracelets, fitness bands and the like. Wearable devices make technology pervasive by interweaving technology into a user's daily life. A wearable device has either no display or a small display for the user to view information provided by the wearable device. Even when there is a display, however, the size of a viewable area of the display is usually less than 1.5 $in^2$. For instance, a smart watch may be equipped with a touch-sensing display for a user to interact with the smart watch. Nevertheless, it is not easy for the user to user his/her finger to operate the tiny display.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

Implementations in accordance with the present disclosure provide various intuitive human-machine interfaces (HMIs) for a user to interact with an interactive wearable device. Gestures or movements by a user (e.g., by a finger, hand and/or arm), automatic recognition of what is pointed by the user, proximity sensing, voice recognition, biometric information matching and various sensing techniques may be used as ways for the user to enter user inputs, e.g., commands, for the wearable device to carry out various actions and/or launch various applications. Accordingly, the aforementioned problem associated with the small touch screen of a wearable device is at least addressed, alleviated or otherwise minimized.

In one example implementation, a method may involve detecting a movement of a wearable device. The method may also involve determining whether a path of the movement corresponds to one or more predefined patterns. The method may further involve performing one or more operations on the wearable device responsive to a determination that the path of the movement corresponds to at least one of the one or more predefined patterns.

In another example implementation, a method may involve detecting a presence of a remote device in a vicinity of a wearable device. The method may also involve determining whether an authentication is successful with respect to the remote device. The method may further involve triggering the remote device to perform one or more operations responsive to a determination that the authentication is successful with respect to the remote device.

In yet another example implementation, a method may involve receiving data from one or more sensors of a wearable device. The method may also involve performing one or more operations in response to the received data.

In one example implementation, an apparatus may include one or more sensors and a processor coupled to receive sensor data from the one or more sensors. The processor may be configured to detect a movement and determine whether a path of the movement corresponds to one or more predefined patterns. The processor may be also configured to perform one or more operations responsive to a determination that the path of the movement corresponds to at least one of the one or more predefined patterns.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Implementations in accordance with the present disclosure relate to various techniques, methods and/or schemes with respect to interacting with a wearable device which may be worn by or otherwise attached to a user. In some embodiments, the wearable device may be worn by or otherwise attached to a user utilizing a wearing structure. The term "wearable device" herein may refer to, for example and not limited to, a smartphone, smartwatch, smart bracelet, smart wristband, smart ankle band, smart ring, smart necklace, any smart accessory or smart wearable peripheral. The term "smart" in the context of a wearable device herein may refer to a wearable device being equipped with necessary hardware (e.g., electronics, electromechanical feature(s), sensor(s), memory, circuitry) as well as firmware and/or software executable by at least a portion of the hardware to effectuate one or more logics, algorithms and/or applications to achieve one or more implementations in accordance with the present disclosure.

Figure 1:
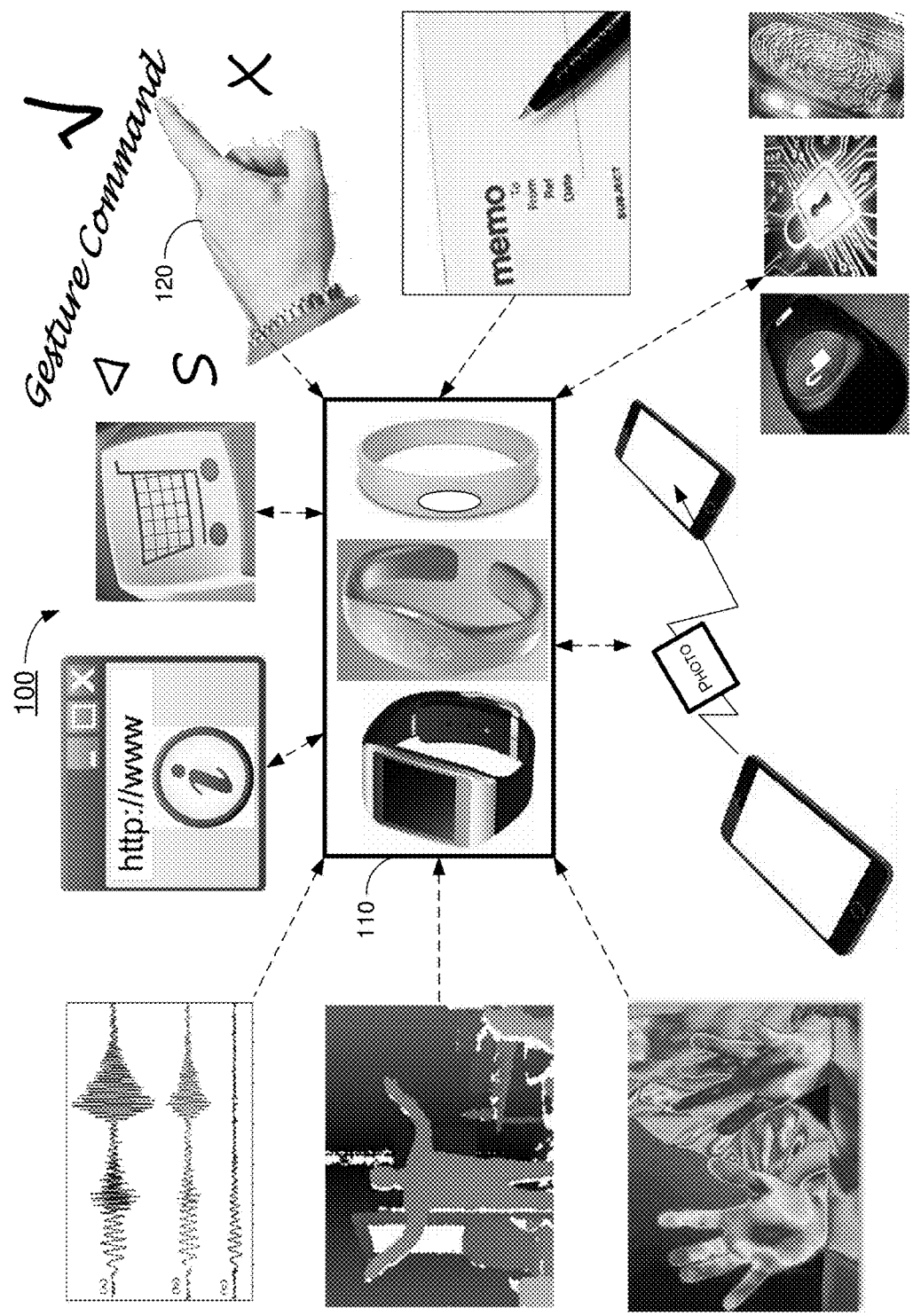
FIG. 1 is a diagram of an overview of various example implementations in accordance with the present disclosure.

FIG. 1 illustrates an overview 100 of various example implementations in accordance with the present disclosure. In overview 100, an apparatus 110, which may be a wearable device, is configured to perform various functions described herein and any variations and derivatives thereof. Apparatus 110 may be, for example and not limited to, a smartphone, smartwatch, smart bracelet, smart wristband, smart ankle band, smart ring, smart necklace, any smart accessory or smart wearable peripheral. In the example shown in FIG. 1, images of a smartwatch, a smart bracelet and a smart wristband are shown as an indication that apparatus 110 may be any type of wearable device conceivable.

Apparatus 110 may be equipped to wirelessly communicate with one or more other devices by way of any suitable ways of wireless communication such as, for example and not limited to, radio frequency (RF), optical, sonic and electromagnetic communications. Accordingly, apparatus 110 may be configured to wirelessly communicate with one or more other devices in a vicinity of apparatus 110 such as, for example and not limited to, a mobile device, an earphone, another wearable device, a household appliance, a networking device and any device equipped with wireless communications capability. Apparatus 110 may be configured for wireless communication according to and in compliance with any existing and to-be-developed wireless communication protocols and technologies such as, for example and not limited to, Wi-Fi and any other Institute of Electrical and Electronics Engineers (IEEE) standards, Bluetooth, Near Field Communication (NFC) and cellular data service. In addition to wireless communication, or as an alternative, apparatus 110 may be equipped with wired communication. For instance, apparatus 110 may be equipped with one or more serial ports and/or one or more parallel ports. As an example, apparatus 110 may be equipped with one or more Universal Serial Bus (USB) ports, one or more FireWire ports, or any other serial communication port(s).

Apparatus 110 may be configured to sense, monitor or otherwise detect motions and movements thereof caused by a user wearing apparatus 110. For instance, a user may wear apparatus 110 on a limb of the user (e.g., around the wrist of an arm or around the ankle of a leg) and, accordingly, apparatus 110 may sense, monitor or otherwise detect motions and/or movements made by the user. As an example, the user may wear apparatus 110 on one of his/her arms and make gestures with that arm or the hand associated with that arm, and in such case apparatus 110 may sense movements/motions with, for example and not limited to, one or more accelerometers, one or more gyro sensors and/or one or more optical image sensors. As another example, the user may wear apparatus 110 on one of his/her arms and make gestures with the other arm or the hand associated with the other arm, and in such case apparatus 110 may sense movements/motions with, for example and not limited to, one or more optical image sensors.

In some implementations, the user may make user inputs in the form of "gesture commands" by moving an arm (on which apparatus 110 is worn or the other arm of the user) and/or the hand associated with that arm (e.g., hand 120 shown in FIG. 1) in the air so as to make air gesture(s) along one or more paths according to one or more predefined patterns. Each of the one or more predefined patterns may correspond to a respective gesture command of one or more gesture commands previously configured and stored in apparatus 110. That is, when the path of a particular movement of an arm or hand in the air by the user matches one of one or more predefined patterns, the particular movement of the arm or hand by the user may correspond to a particular gesture command as a user input to apparatus 110, based on which apparatus 110 may carry out, execute or otherwise perform one or more corresponding operations and/or tasks. In some implementations, the one or more predefined patterns may include one or more alphabets of any language (e.g., English or another European alphabets), one or more symbols, one or more numbers and/or one or more characters of any language (e.g., Chinese or another Asian characters). The one or more predefined patterns may be set, entered, selected, defined or otherwise configured by the user and recorded in apparatus 110 at a previous time. The alphabets may be either capitalized or not capitalized.

There are a wide variety of applications in which using gesture commands to interact with apparatus 110 can be appreciated by those skilled in the art. In some scenarios, apparatus 110 may recognize a gesture command to indicate that subsequent air gestures sensed or detected by apparatus 110 are alphabets of a memo that the user intends to record. Accordingly, the user may first perform an air gesture to signal to apparatus 110 that a memo is to be created and recorded, and then the user may perform "air writing", similar to air gesturing, by writing alphabets or letters by moving his/her arm and/or hand (e.g., hand 120) in the air. At the end of the memo, the user may perform an air gesture as a gesture command to signal to apparatus 110 that the memo is complete and is to be saved and/or transmitted to one or more recipients (e.g., family and/or friends of the user). This feature is convenient to the user especially when the user is outside of home or office without a pen and/or paper to jot down notes or to write a memo.

In some scenarios, the user may have taken one or more photos and/or video clips with his/her smartphone. In this case, apparatus 110 may be a smart wristband, for example, and the user may perform an air gesture as a gesture command such that apparatus 110 may wirelessly communicate with the smartphone to trigger the smartphone to send at least one of the one or more photos and/or video clips to one or more other devices (e.g., smartphones and/or computers of family and friends of the user).

In some scenarios, apparatus 110 may be used as a way for the user to authenticate him/herself in order for apparatus 110 to perform one or more operations/tasks for the user. For example, the user may perform an air gesture for authentication to indicate to apparatus 110 that the user has proper authority to request to have one or more photos, video clips and/or other type of data to be transmitted from one device (e.g., the user's smartphone or apparatus 110) to another device. As another example, apparatus 110 may be able to detect the presence of an authentication application or device which requires the user to authenticate him/herself with apparatus 110. In such case apparatus 110 may perform an air gesture for authentication to indicate to apparatus 110 that the user has proper authority to gain access to the authentication application or device. For instance, the user may authenticate him/herself with an air gesture such that, upon authentication, apparatus 110 may wirelessly transmit a signal to an authentication device associated with a lock of a door or a security system of a building (e.g., home or office) or a vehicle (e.g., a car) to unlock the lock or disarm the security system. The air gesture for authentication may include any pattern such as, for example and not limited to, a sequence of rotations each with a respective angle so as to mimic the action of opening a combination lock. Alternatively or additionally, apparatus 110 may receive a voice command, analyze the voice in the voice command and determine whether the voice in the voice command matches a pre-recorded voice of the user and whether the voice command matches one of one or more predefined voice commands. Upon a positive match, apparatus 110 may determine that the user is authenticated. Alternatively or additionally, apparatus 110 may monitor one or more biometric parameters of the user for authentication. For instance, apparatus 110 may monitor the heart rate of the user who wears apparatus 110 and analyze the heart rate (or any variation thereof) to determine whether the heart rate (or any variation thereof) matches a pre-recorded heart rate or pre-recorded variation in heart rate of the user. Upon a positive match, apparatus 110 may determine that the user is authenticated.

In some scenarios, apparatus 110 may include one or more microphones, one or more image sensors, one or more gyro sensors, one or more accelerometers, one or more vibration sensors, one or more thermal sensors, one or more pressure sensors, one or more ultrasonic transducers (and, optionally, corresponding sensor(s)), one or more light sensors, one or more gyro sensors, or a combination thereof to sense, detect, extract, collect or otherwise obtain information for or pertaining to object detection and/or environment monitoring. For example, apparatus 110 may include one or more microphones that allow apparatus 110 to recognize special command(s) from the user for authentication.

As another example, apparatus 110 may include one or more image sensors that allow apparatus 110 to obtain a visual image of a hand (e.g., hand 120) of the user and one or more objects to identify a protrusion from the hand (e.g., a finger, a pen, a pencil or a pointer) in the visual image and determine an object among the one or more objects being pointed by the protrusion. Upon determining the pointed object, apparatus 110 may perform one or more operations related to the object automatically or upon receiving a gesture command from the user. For instance, apparatus 110 may search information related to the object, present to the user the searched information related to the object and/or render a transaction with respect to the object or another object similar to the object (e.g., purchase the object or a similar object at an online store). When apparatus 110 determines that the user is pointing to a piece of artwork (e.g., sculpture or painting), apparatus 110 may present audibly, visually or both audibly and visually information about the author and its history. When apparatus 110 determines that the user is pointing to a book, a CD-ROM, a DVD or the like, apparatus 110 may present or play the abstract of the book, CD-ROM or DVD as well as present introduction or comments about the book, CD-ROM or DVD found on the Internet. Whatever the object may be, the user may render an air gesture that resembles a pre-registered pattern as a "purchase" gesture command for apparatus 110 to purchase the object (or a similar object) online.

As another example, apparatus 110 may include one or more gyro sensors that allow apparatus 110 to record and recognize the roughness of a texture of a surface of an object when one or more fingers of the user swipe across the surface of the object. The roughness may be utilized by apparatus 110 (or another device) in recognition of the object. Relevant data may be recorded for future reference and/or usage such as, for example and not limited to, sharing with others and/or reproducing the vibration (e.g., through a vibrator) to re-generate a feeling of the roughness of the surface of the object.

As another example, apparatus 110 may include one or more thermal sensors that allow apparatus 110 to detect, measure, monitor or otherwise determine a temperature of an object (e.g., when the user is drinking a beverage) and present information on the temperature to the user, whether audibly, visually or both audibly and visually. Alternatively or additionally, apparatus 110 may transmit the information on the temperature to a remote device (e.g., a smartphone of the user or another device). Alternatively or additionally, apparatus 110 may determine whether the temperature exceeds or reaches a threshold temperature and, in the event that the temperature exceeds or reaches the threshold temperature, apparatus 110 may transmit or present a warning message, whether audibly, visually or both audibly and visually, so as to warn the user or any other individual(s) and/or devices. An example application may be that apparatus 110 may be a smart wristband which may monitor the temperature of a user (e.g., a patient or a child) wearing apparatus 110 to send out warning signals (e.g., to hospital staff or family) when the body temperature of the user reaches or exceeds a threshold temperature.

As another example, apparatus 110 may include one or more pressure sensors that allow apparatus 110 to detect, measure, monitor or otherwise determine an ambient pressure. This may, in turn, allow apparatus 110 to determine an altitude where apparatus 110 (and presumably the user) is located.

As another example, apparatus 110 may include one or more ultrasonic transducers that allow apparatus 110 to transmit ultrasonic waves and receive reflected ultrasonic waves to generate a depth map of the surrounding. Optionally, apparatus 110 may include one or more ultrasonic sensors to receive or otherwise detect the reflected ultrasonic waves. In some applications, the depth map may allow apparatus 110 to determine, for example and not limited to, a distance between finger(s) of the user and one or more objects. This may aid quick and robust initiation of object detection as well as improvement of performance of object detection by apparatus 110. In some applications, the depth map may allow apparatus 110 to detect an internal structure of a solid object or a human body (e.g., in medical inspection). Alternatively or additionally, apparatus 110 may include one or more light sources and one or more light sensors that allow apparatus 110 to transmit optical signals and receive reflected optical signals to achieve the aforementioned results as with ultrasonic transducers.

Figure 2:
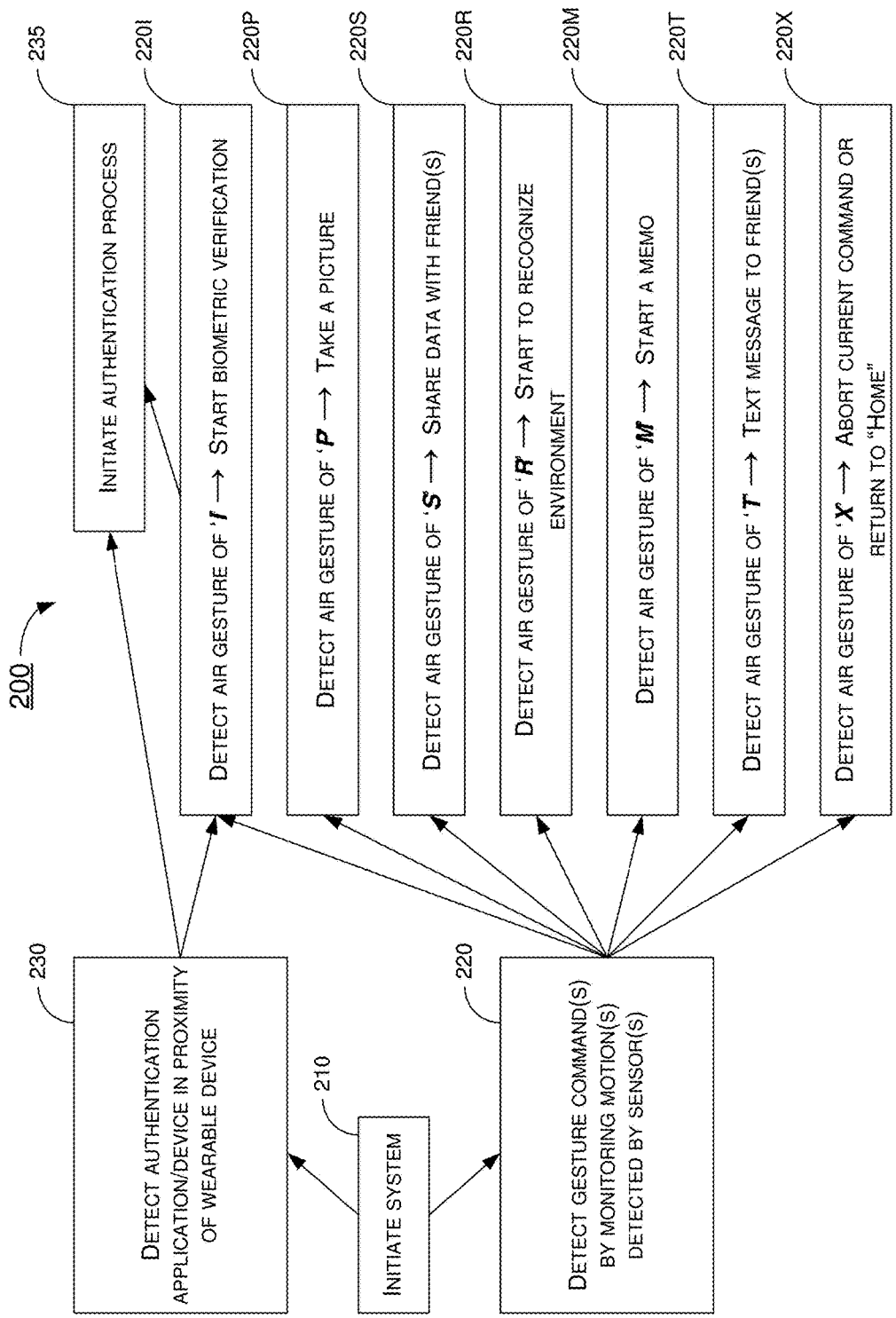
FIG. 2 is a diagram of an example algorithm in accordance with an implementation of the present disclosure.

FIG. 2 illustrates an example algorithm 200 in accordance with an implementation of the present disclosure. Algorithm 200 may include one or more operations, actions, or functions as represented by one or more blocks such as blocks 210, 220, 230, 235, 220I, 220P, 220S, 220R, 220M, 220T and 220X. Although illustrated as discrete blocks, various blocks of algorithm 200 may be divided into additional blocks, combined into fewer blocks, or eliminated, depending on the desired implementation. The blocks of algorithm 200 may be performed in the order shown in FIG. 2 or in any other order, depending on the desired implementation. Algorithm 200 may be implemented by apparatus 110. For illustrative purpose without limiting the scope of the present disclosure, the following description of algorithm 200 is provided in the context of apparatus 110 although algorithm 200 may be implemented by wearable devices other than apparatus 110. Algorithm 200 may start at 210.

At 210, an interactive system in apparatus 110 may be initiated by a user or automatically. Algorithm 200 may proceed from 210 to 220 or 230.

At 220, apparatus 110 may detect one or more air gestures by monitoring one or more motion or movements as detected by one or more sensors of apparatus 110. Algorithm 200 may proceed from 220 to any of 220I, 220P, 220S, 220R, 220M, 220T and 220X depending on what the detected air gesture(s) may be.

At 230, apparatus 110 may detect a remote authentication application or device in the proximity of apparatus 110. Algorithm 200 may proceed from 230 to 220I or 235.

At 220I, when apparatus 110 detects an air gesture or air writing of the alphabet 'I', apparatus 110 may proceed to start verification of the user based on one or more biometric parameters of the user. Upon a positive or successful verification, algorithm 200 may proceed from 220I to 235.

At 235, apparatus 110 may initiate an authentication process with the remote authentication application or device.

At 220P, when apparatus 110 detects an air gesture or air writing of the alphabet 'P', apparatus 110 may proceed to take a picture (e.g., when apparatus 110 is equipped with a camera) or trigger a mobile device (e.g., a smartphone or a camera) to take the picture.

At 220S, when apparatus 110 detects an air gesture or air writing of the alphabet 'S', apparatus 110 may proceed to share data (e.g., photo(s), video clip(s), message(s) and/or memo(s)) with one or more predefined recipients. Apparatus 110 may either directly transmit the shared data or trigger a remote device to transmit the shared data.

At 220R, when apparatus 110 detects an air gesture or air writing of the alphabet 'R', apparatus 110 may proceed to recognize an environment in which apparatus 110 is situated. For instance, apparatus 110 may utilize one or more sensors to generate a depth map or determine one or more environmental parameters such as, for example and not limited to, pressure, temperature, brightness and humidity.

At 220M, when apparatus 110 detects an air gesture or air writing of the alphabet 'M', apparatus 110 may proceed to create a memo by recording subsequent patterns from air writing by the user.

At 220T, when apparatus 110 detects an air gesture or air writing of the alphabet 'T', apparatus 110 may proceed to create and/or sent a text message to one or more predefined recipients.

At 220X, when apparatus 110 detects an air gesture or air writing of the alphabet 'X', apparatus 110 may proceed to abort a current command being executed and/or return to a "home" page or mode.

Those skilled in the art would appreciate that there may be other and different alphabets, symbols, numbers and characters that apparatus 110 may recognize. Thus, in the interest of brevity an exhaustive list of possible patterns that apparatus 110 may recognize as gesture commands is not provided.

Figure 3:
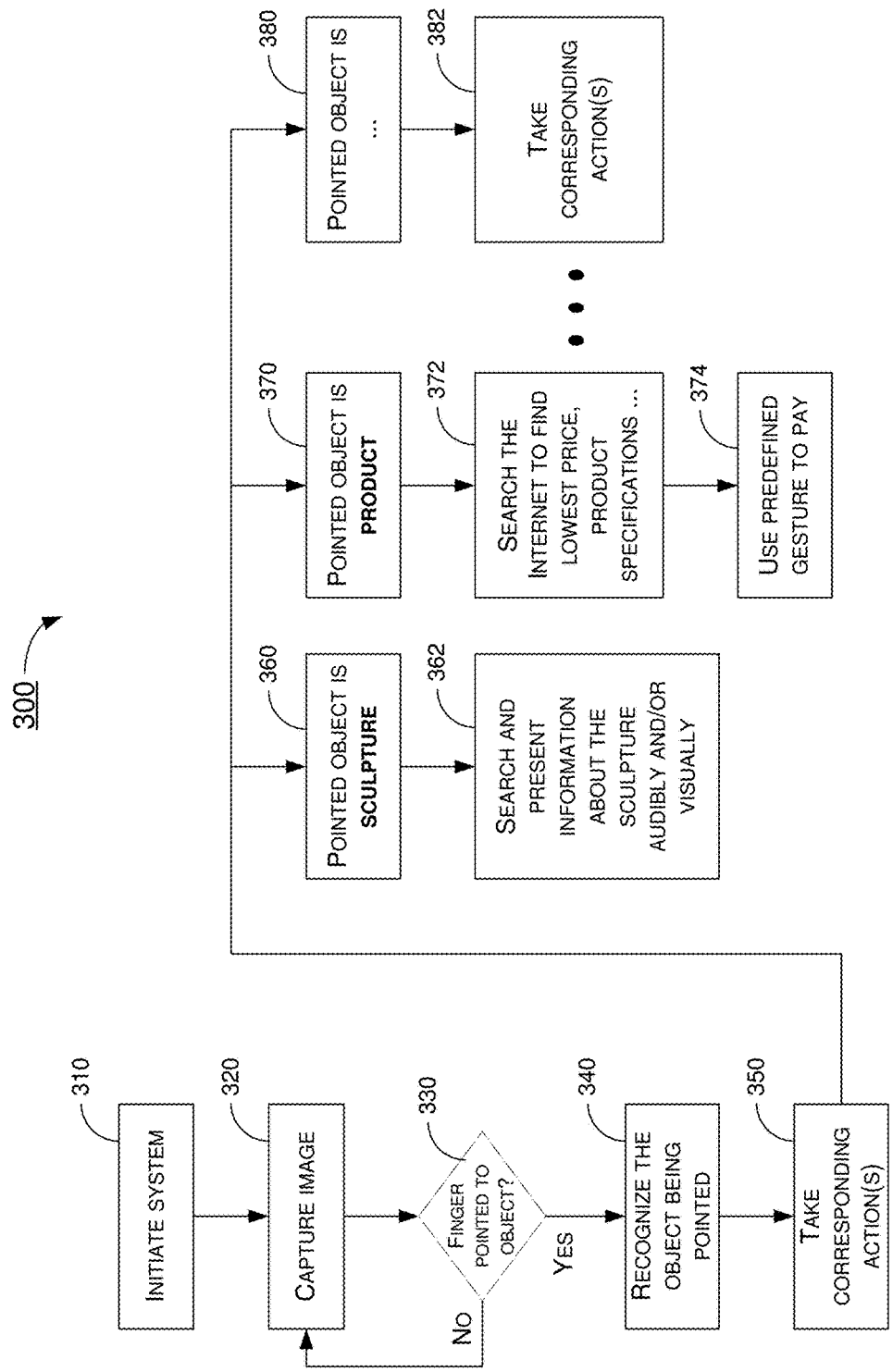
FIG. 3 is a diagram of an example algorithm in accordance with an implementation of the present disclosure.

FIG. 3 illustrates an example algorithm 300 in accordance with an implementation of the present disclosure. Algorithm 300 may include one or more operations, actions, or functions as represented by one or more blocks such as blocks 310, 320, 330, 340, 350, 360, 362, 370, 372, 374, 380 and 382. Although illustrated as discrete blocks, various blocks of algorithm 300 may be divided into additional blocks, combined into fewer blocks, or eliminated, depending on the desired implementation. The blocks of algorithm 300 may be performed in the order shown in FIG. 3 or in any other order, depending on the desired implementation. Algorithm 300 may be implemented by apparatus 110. For illustrative purpose without limiting the scope of the present disclosure, the following description of algorithm 300 is provided in the context of apparatus 110 although algorithm 300 may be implemented by wearable devices other than apparatus 110. Algorithm 300 may start at 310.

At 310, an interactive system in apparatus 110 may be initiated by a user or automatically. Algorithm 300 may proceed from 310 to 320.

At 320, apparatus 110 may capture an image using one or more image sensors thereof. Algorithm 300 may proceed from 320 to 330.

At 330, apparatus 110 may determine whether in the captured image there a finger (e.g., finger of hand 120) is pointing to any object. Algorithm 300 may proceed from 330 to 340 in an event that the image shows a finger pointing to an object; otherwise algorithm 300 may return to 320.

At 340, apparatus 110 may identify, determine or otherwise recognize the object being pointed. Algorithm 300 may proceed from 340 to 350.

At 350, apparatus 110 may take corresponding one or more actions or perform corresponding one or more operations depending on what the object is recognized to be. For illustrative purpose without limiting the scope of the present disclosure, a few example scenarios is provided below.

At 360, apparatus 110 may recognize the pointed object to be a sculpture (or another form of artwork). Algorithm 300 may proceed from 360 to 362.

At 362, apparatus 110 may search and present information about the sculpture (or another form of artwork) to the user audibly, visually or both audibly and visually.

At 370, apparatus 110 may recognize the pointed object to be a product, for example, for sale. Algorithm 300 may proceed from 370 to 372.

At 372, apparatus 110 may perform search (for example, utilizing the Internet) to obtain and present to the user information related to the product such as, for example and not limited to, the lowest price of the product and specifications of the product. Algorithm 300 may proceed from 372 to 374.

At 374, apparatus 110 may detect an air gesture from the user to identify a predefined air gesture as a gesture command to purchase the product and, accordingly, apparatus 110 may complete an online transaction to purchase the product.

At 380, apparatus 110 may recognize the pointed to be another item. Algorithm 300 may proceed from 380 to 382.

At 382, apparatus 110 may take corresponding action(s) and/or perform corresponding operation(s) with respect to the object.

Those skilled in the art would appreciate that there may be other and different types of objects that apparatus 110 may recognize. Thus, in the interest of brevity an exhaustive list of possible objects that apparatus 110 may recognize is not provided.

Figure 4:
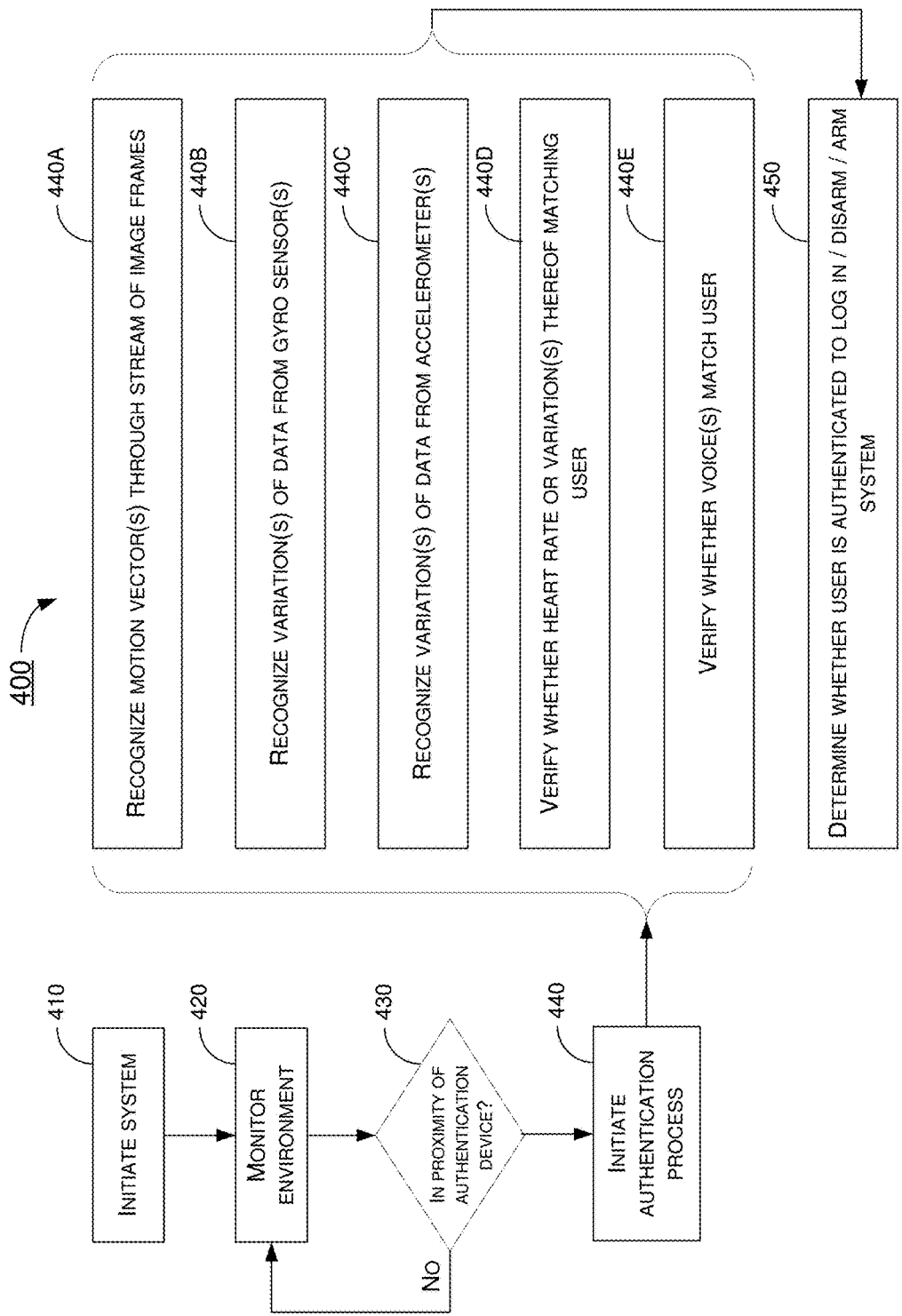
FIG. 4 is a diagram of an example algorithm in accordance with an implementation of the present disclosure.

FIG. 4 illustrates an example algorithm 400 in accordance with an implementation of the present disclosure. Algorithm 400 may include one or more operations, actions, or functions as represented by one or more blocks such as blocks 410, 420, 430, 440, 440A, 440B, 440C, 440D, 440E and 450. Although illustrated as discrete blocks, various blocks of algorithm 400 may be divided into additional blocks, combined into fewer blocks, or eliminated, depending on the desired implementation. The blocks of algorithm 400 may be performed in the order shown in FIG. 4 or in any other order, depending on the desired implementation. Algorithm 400 may be implemented by apparatus 110. For illustrative purpose without limiting the scope of the present disclosure, the following description of algorithm 400 is provided in the context of apparatus 110 although algorithm 400 may be implemented by wearable devices other than apparatus 110. Algorithm 400 may start at 410.

At 410, an interactive system in apparatus 110 may be initiated by a user or automatically. Algorithm 400 may proceed from 410 to 420.

At 420, apparatus 110 may monitor an environment in which apparatus 110 is situated. Algorithm 400 may proceed from 420 to 430.

At 430, apparatus 110 may determine whether an authentication device is in proximity (e.g., within a wirelessly detectable range) of apparatus 110. Algorithm 400 may proceed from 430 to 440 in an event that an authentication device is in the proximity of apparatus 110; otherwise algorithm 400 may return to 420.

At 440, apparatus 110 may initiate an authentication process which may involve, for example and not limited to, one or more of processes 440A-440E.

At 440A, apparatus 110 may recognize one or more motion vectors through a stream of image frames sensed by one or more image sensors to identify one or more air gestures performed by the user.

At 440B, apparatus 110 may recognize one or more variations in the data sensed by one or more gyro sensors to identify one or more air gestures performed by the user.

At 440C, apparatus 110 may recognize one or more variations in the data sensed by one or more accelerometers to identify one or more air gestures performed by the user.

At 440D, apparatus 110 may verify whether a heart rate (or variation(s) thereof) of the user matches a pre-recorded heart rate (or variation(s) thereof) of the user.

At 440E, apparatus 110 may verify whether a voice in one or more voice commands received from the user matches a pre-recorded voice of the user.

Algorithm 400 may proceed from any of 440A-440E to 450.

At 450, apparatus 110 may determine whether the user is authenticated based on the result of determination at any of 440A-440E or a combination thereof and, upon a successful authentication of the user, apparatus 110 may communicate with the authentication device to take appropriate action(s) such as, for example and not limited to, logging in, disarming and/or unlocking.

Those skilled in the art would appreciate that there may be other and different types of parameters that apparatus 110 may monitor for the purpose of authentication. Thus, in the interest of brevity an exhaustive list of possible parameters that apparatus 110 may monitor is not provided.

Example Implementations

Figure 5:
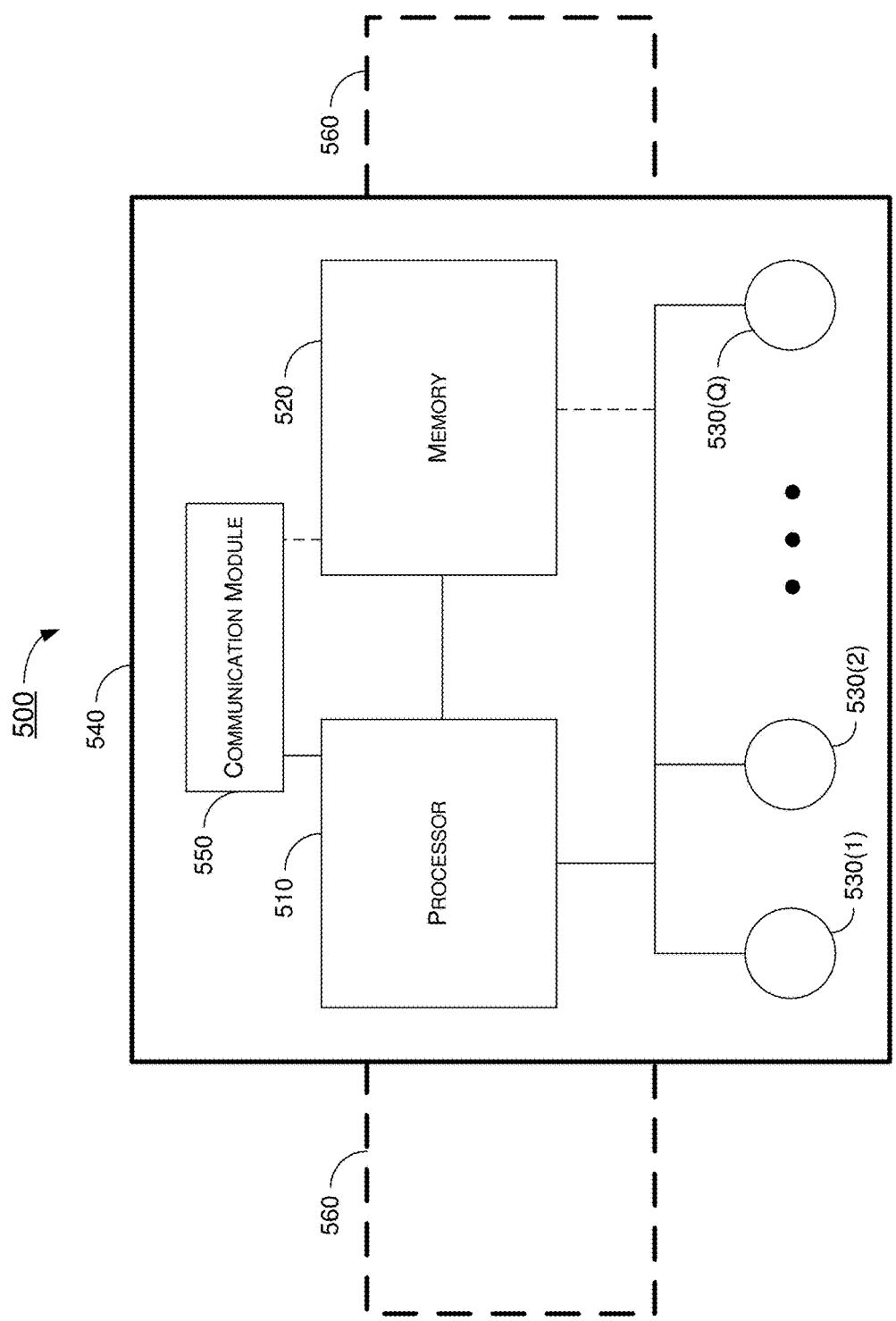
FIG. 5 is a block diagram of an example apparatus in accordance with an implementation of the present disclosure.

FIG. 5 illustrates an example apparatus 500 in accordance with an implementation of the present disclosure. Apparatus 500 may be an example implementation of apparatus 110. Apparatus 500 may perform various functions to implement techniques, schemes and methods described herein, including overview 100, algorithm 200, algorithm 300 and algorithm 400 described above as well as processes 600, 700 and 800 described below. In some implementations, apparatus 500 may be an electronic apparatus which may be a wearable device such as, for example, a smartphone, smartwatch, smart bracelet, smart wristband, smart ankle band, smart ring, smart necklace, any smart accessory or smart wearable peripheral that can be worn or carried by a user.

Apparatus 500 may include at least those components shown in FIG. 5, such as a processor 510, a memory 520, a communication module 550, one or more sensors 530(1)-530(Q), with Q being a positive integer greater than or equal to 1, and a casing 540 that contains processor 510, memory 520, communication module 550 and one or more sensors 530(1)-530(Q) therein. Optionally, apparatus 500 may also include an appendage mechanism 560 (e.g., wrist band or ankle band) coupled to casing 540 and configured to attach to a user. Processor 510 may be communicatively and/or operably coupled to memory 520, communication module 550 and each of one or more sensors 530(1)-530(Q). Optionally, memory 520 may also be communicatively and/or operably coupled to communication module 550 and/or at least one of one or more sensors 530(1)-530(Q).

The one or more sensors 530(1)-530(Q) may include one or more microphones, one or more image sensors, one or more gyro sensors, one or more accelerometers, one or more vibration sensors, one or more thermal sensors, one or more pressure sensors, one or more ultrasonic transducers (and, optionally, corresponding sensor(s)), one or more light sensors, one or more gyro sensors, or a combination thereof.

Memory 520 may be configured to store multiple sets of processor-executable instructions corresponding to multiple applications. Memory 520 may include one or more computer-readable mediums such as a type of read-only memory (ROM) or random-access memory (RAM). For example, memory 520 may include a dynamic RAM (DRAM), static RAM (SRAM), thyristor RAM (T-RAM), zero-capacitor RAM (Z-RAM) or another type of volatile memory. As another example, memory device may include mask ROM, programmable ROM (PROM), erasable programmable ROM (EPROM), electrically-erasable programmable ROM (EEPROM), flash memory, solid-state memory or another type of non-volatile memory.

Communication module 530 may include necessary hardware and/or software to perform wireless and/or wired communications with one or more external or remote devices. For instance, under the control of processor 510, communication module 550 may engage in wireless and/or wired communication with one or more other devices to transmit and receive data.

Processor 510 may be implemented in the form of a single integrated-circuit (IC) chip or a chipset of multiple IC chips. For instance, processor 510 may be an application-specific integrated circuit (ASIC), a micro-controller unit (MCU), a system-on-chip (SOC) or a central processing unit (CPU) of apparatus 500. Processor 510 may be coupled to receive sensor data from the one or more sensors 530(1)-530(Q) and configured to perform a number of operations. For instance, based on the data from the one or more sensors 530(1)-530(Q), processor 510 may detect a movement or motion by the user, determine whether a path of the movement corresponds to one or more predefined patterns, and perform one or more operations responsive to a determination that the path of the movement corresponds to at least one of the one or more predefined patterns.

In some implementations, in determining whether the path of the movement corresponds to the one or more predefined patterns, processor 510 may be configured to determine that the path of the movement resembles one of the one or more predefined patterns corresponding to a first predefined command.

In some implementations, processor 510 may be also configured to detect a presence of an authentication device and initiate an authentication process with the authentication device.

In some implementations, processor 510 may be configured to further perform a number of other operations. For instance, processor 510 may detect another movement by the user, determine that a path of the another movement corresponds to a second predefined command, and abort the one or more operations being performed on apparatus 500 according to the second predefined command.

In some implementations, processor 510 may be configured to further perform a number of other operations. For instance, processor 510 may obtain a visual image of a hand of the user and one or more objects and identify a protrusion from the hand in the visual image. Processor 510 may also determine an object among the one or more objects being pointed by the protrusion. Processor 510 may further perform at least one operation related to the object. In some implementations, in performing the at least one operation related to the object, processor 510 may be configured to perform one or more of searching information related to the object, presenting to the user the searched information related to the object, and rendering a transaction with respect to the object or another object similar to the object.

In some implementations, the one or more predefined patterns may include one or more alphabets, one or more symbols, one or more numbers, one or more characters, or a combination thereof. Accordingly, in performing the one or more operations, processor 510 may be configured to identify one or more alphabets, symbols, numbers, or characters corresponding to the path of the movement. Processor 510 may be also configured to record the one or more alphabets, symbols, numbers, or characters in a memo.

In some implementations, the one or more predefined patterns may include one or more predefined user commands. Accordingly, in performing the one or more operations, processor 510 may be configured to identify one user command of the one or more predefined user commands corresponding to the path of the movement. Processor 510 may be also configured to perform a task corresponding to the one user command with the wearable device. For example, processor 510 may trigger a first electronic device to transfer textual data, audio data, video data, or a combination thereof to a second electronic device responsive to a result of the authentication process indicating that the user is authenticated. As another example, processor 510 may trigger a first electronic device or a camera on the wearable device to capture a still image or a video. Additionally, processor 510 may trigger the first electronic device or the wearable device to transfer the still image or video to a second electronic device.

In some implementations, processor 510 may be configured to further perform a number of other operations. For instance, processor 510 may detect a presence of a remote device and determine whether the user is authenticated with respect to the remote device. Processor 510 may also trigger the remote device to perform one or more operations responsive to a determination that the user is authenticated with respect to the remote device. In some implementations, in determining whether the user is authenticated with respect to the remote device, processor 510 may be configured to determine that the user is authenticated responsive to a result of the path of the movement corresponding to one of the one or more predefined patterns indicating that the user is authenticated. Alternatively or additionally, in determining whether the user is authenticated with respect to the remote device, processor 510 may be configured to receive a voice command from the user through the one or more sensors. Processor 510 may also analyze a voice in the voice command and determine that the user is authenticated responsive to a result of the analyzing indicating the voice in the voice command being recognized as a voice associated with the user. Alternatively or additionally, in determining whether the user is authenticated with respect to the remote device, processor 510 may be configured to monitor a heart rate of the user based on the data from the one or more sensors. Processor 510 may also analyze a variation in the heart rate and determine that the user is authenticated responsive to the variation in the heart rate matching a pre-recorded variation in the heart rate of the user based on a result of the analyzing.

In some implementations, at least one sensor of the one or more sensors 530(1)-530(Q) may include a microphone configured to provide to processor 510 audible data indicative of a voice command received by the microphone. Accordingly, in performing the one or more operations, processor 510 may be configured to initiate an authentication process responsive to the voice command.

In some implementations, at least one sensor of the one or more sensors 530(1)-530(Q) may include a gyro sensor configured to provide to processor 510 gyro data indicative of a vibration sensed by the gyro sensor. Accordingly, in performing the one or more operations, processor 510 may be configured to record the gyro data and transmit the gyro data to a remote device such that the vibration may be reproduced by the remote device.

In some implementations, at least one sensor of the one or more sensors 530(1)-530(Q) may include a thermal sensor configured to provide to processor 510 thermal data indicative of a temperature sensed by the thermal sensor, and wherein, in performing the one or more operations, the processor is configured to perform at least one of a variety of tasks such as, for example and not limited to, presenting the temperature to the user audibly, visually, or both audibly and visually; transmitting information indicative of the temperature to a remote device; determining whether the temperature exceeds a threshold; and transmitting a warning message to the remote device or presenting a warning message audibly, visually, or both audibly and visually responsive to a determination that the temperature exceeds the threshold.

In some implementations, at least one sensor of the one or more sensors 530(1)-530(Q) may include a pressure sensor configured to provide to processor 510 pressure data indicative of a pressure sensed by the pressure sensor. Accordingly, in performing the one or more operations, processor 510 may be configured to determine an altitude of the wearable device based on the pressure. Processor 510 may be also configured to present information indicating the altitude to the user audibly, visually, or both audibly and visually.

In some implementations, at least one sensor of the one or more sensors 530(1)-530(Q) may include one or more ultrasonic transducers configured to provide to processor 510 ultrasonic data indicative of ultrasonic waves sensed by the one or more ultrasonic transducers. Accordingly, in performing the one or more operations, processor 510 may be configured to generate a depth map using the ultrasonic data and determine a spatial relationship between an object and the user or between the object and the one or more ultrasonic transducers based at least in part on the depth map.

In some implementations, at least one sensor of the one or more sensors 530(1)-530(Q) may include one or more light sensors configured to provide to processor 510 lighting data indicative of ambient lighting sensed by the one or more light sensors. Accordingly, in performing the one or more operations, processor 510 may be configured to generate a depth map using the lighting data and determine a spatial relationship between an object and the user or between the object and the one or more light sensors based at least in part on the depth map.

Figure 6:
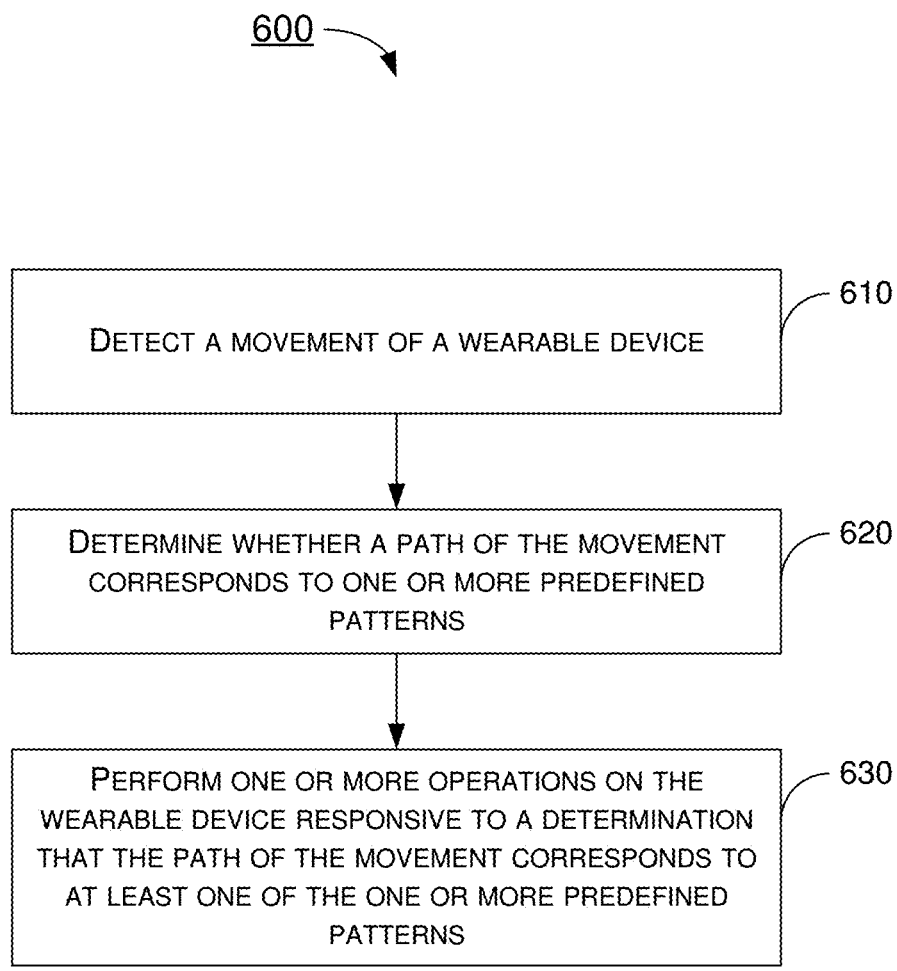
FIG. 6 is a flowchart of an example process in accordance with an implementation of the present disclosure.

FIG. 6 illustrates an example process 600 in accordance with an implementation of the present disclosure. Process 600 may be an example implementation of algorithm 200 and/or algorithm 400. Process 600 may include one or more operations, actions, or functions as represented by one or more blocks such as blocks 610, 620 and 630. Although illustrated as discrete blocks, various blocks of process 600 may be divided into additional blocks, combined into fewer blocks, or eliminated, depending on the desired implementation. The blocks may be performed in the order shown in FIG. 6 or in any other order, depending on the desired implementation. Process 600 may be implemented by apparatus 110 and apparatus 500. Solely for illustrative purpose and without limiting the scope of the present disclosure, process 600 is described below in the context of process 600 being performed by apparatus 500. Process 600 may begin at 610.

At 610, process 600 may involve a wearable device, such as apparatus 500 for example, detecting a movement of the wearable device worn by a user. Process 600 may proceed from 610 to 620.

At 620, process 600 may involve apparatus 500 determining whether a path of the movement corresponds to one or more predefined patterns. Process 600 may proceed from 620 to 630.

At 630, process 600 may involve apparatus 500 performing one or more operations on the wearable device responsive to a determination that the path of the movement corresponds to at least one of the one or more predefined patterns.

In some implementations, in detecting the movement of apparatus 500, process 600 may involve processor 510 of apparatus 500 receiving data indicative of the movement of apparatus 500 from an optical image sensor, an accelerometer, a gyro sensor, or a combination thereof.

In some implementations, in determining whether the path of the movement corresponds to the one or more predefined patterns, process 600 may involve processor 510 of apparatus 500 determining that the path of the movement resembles one of the one or more predefined patterns corresponding to a first predefined command.

In some implementations, process 600 may involve apparatus 500 performing additional operations. For instance, process 600 may involve processor 510 of apparatus 500 detecting an authentication device in a vicinity of apparatus 500 and initiating an authentication process with the authentication device.

In some implementations, process 600 may involve apparatus 500 performing additional operations. For instance, process 600 may involve processor 510 of apparatus 500 detecting another movement of apparatus 500, determining that a path of the another movement corresponds to a second predefined command, and aborting the one or more operations being performed on apparatus 500 according to the second predefined command.

In some implementations, process 600 may involve apparatus 500 performing additional operations. For instance, process 600 may involve processor 510 of apparatus 500 obtaining a visual image of a hand of the user and one or more objects, identifying a protrusion from the hand in the visual image, and determining an object among the one or more objects being pointed by the protrusion. In performing the one or more operations, process 600 may involve processor 510 of apparatus 500 performing at least one operation related to the object. For example, process 600 may involve processor 510 searching information related to the object, presenting to the user the searched information related to the object, rendering a transaction with respect to the object or another object similar to the object, or performing all of the above.

In some implementations, the one or more predefined patterns may include one or more alphabets, one or more symbols, one or more numbers, one or more characters, or a combination thereof. Accordingly, in performing one or more operations, process 600 may involve processor 510 of apparatus 500 identifying one or more alphabets, symbols, numbers, or characters corresponding to the path of the movement and recording the one or more alphabets, symbols, numbers, or characters in a memo.

In some implementations, the one or more predefined patterns may include one or more predefined user commands. Accordingly, in performing one or more operations, process 600 may involve processor 510 of apparatus 500 identifying one user command of the one or more predefined user commands corresponding to the path of the movement and performing a task corresponding to the one user command with apparatus 500. For example, process 600 may involve processor 510 initiating an authentication process and triggering a first electronic device to transfer textual data, audio data, video data, or a combination thereof to a second electronic device responsive to a result of the authentication process indicating that a result of the authentication process is positive (e.g., the user is authenticated). In another example, process 600 may involve the second electronic device performing the authentication process, and the first electronic device may transfer data regarding the movement to the second electronic device. As another example, process 600 may involve processor 510 triggering a first electronic device or a camera on apparatus 500 to capture a still image or a video and triggering the first electronic device or apparatus 500 to transfer the still image or video to a second electronic device.

Figure 7:
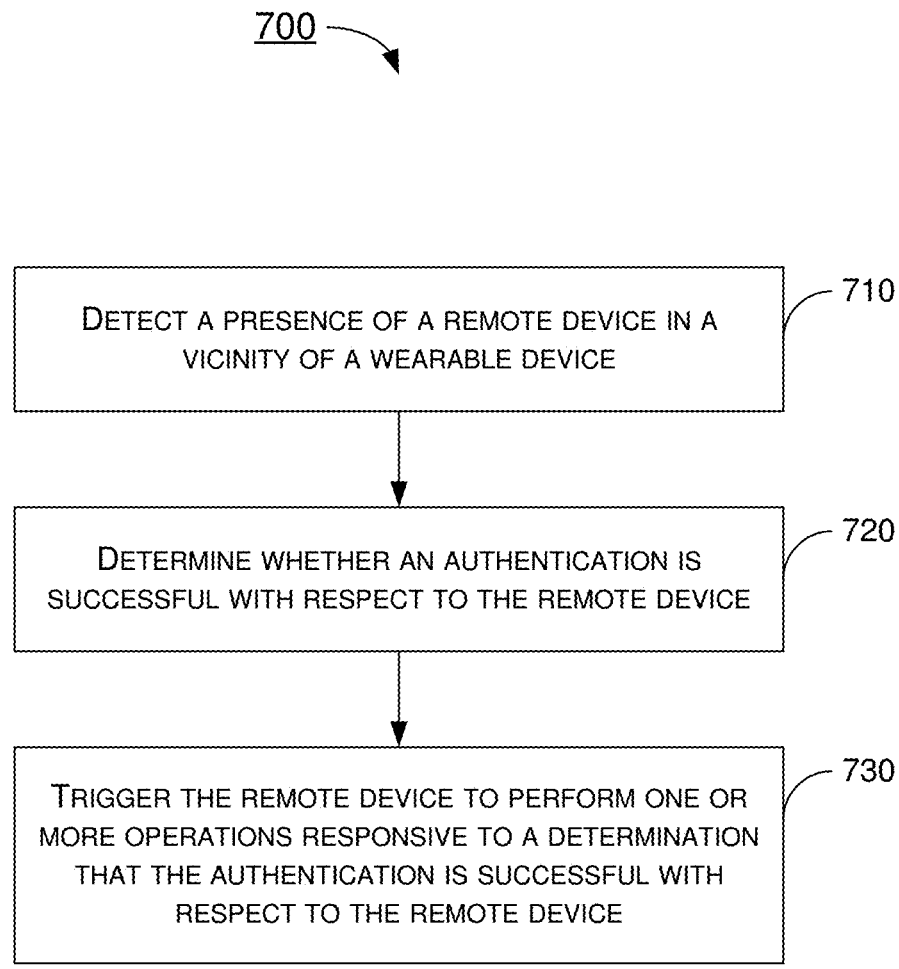
FIG. 7 is a flowchart of an example process in accordance with another implementation of the present disclosure.

FIG. 7 illustrates an example process 700 in accordance with another implementation of the present disclosure. Process 700 may be an example implementation of algorithm 200 and/or algorithm 400. Process 700 may include one or more operations, actions, or functions as represented by one or more blocks such as blocks 710, 720 and 730. Although illustrated as discrete blocks, various blocks of process 700 may be divided into additional blocks, combined into fewer blocks, or eliminated, depending on the desired implementation. The blocks may be performed in the order shown in FIG. 7 or in any other order, depending on the desired implementation. Process 700 may be implemented by apparatus 110 and apparatus 500. Solely for illustrative purpose and without limiting the scope of the present disclosure, process 700 is described below in the context of process 700 being performed by apparatus 500. Process 700 may begin at 710.

At 710, process 700 may involve a wearable device, such as apparatus 500 for example, detecting a presence of a remote device in a vicinity of the wearable device worn by a user. Process 700 may proceed from 710 to 720.

At 720, process 700 may involve apparatus 500 determining whether an authentication is successful (e.g., whether the user is authenticated) with respect to the remote device. Process 700 may proceed from 720 to 730.

At 730, process 700 may involve apparatus 500 triggering the remote device to perform one or more operations responsive to a determination that the authentication is successful (e.g., the user is authenticated) with respect to the remote device.

In some implementations, in determining whether the authentication is successful with respect to the remote device, process 700 may involve processor 510 of apparatus 500 performing a number of operations. For instance, process 700 may involve processor 510 of apparatus 500 detecting a movement, analyzing a path of the movement, and determining that the authentication is successful responsive to a result of the analyzing indicating that the path of the movement resembles a predefined pattern indicating that the authentication is successful (e.g., the user is authenticated).

In some implementations, in detecting the movement, process 700 may involve processor 510 of apparatus 500 receiving data indicative of a movement of apparatus 500 from an optical image sensor, an accelerometer, a gyro sensor, or a combination thereof.

In some implementations, in determining whether the authentication is successful with respect to the remote device, process 700 may involve processor 510 of apparatus 500 performing a number of operations. For instance, process 700 may involve processor 510 of apparatus 500 receiving a voice command, analyzing a voice in the voice command, and determining that the authentication is successful responsive to a result of the analyzing indicating the voice in the voice command being recognized as a prerecorded voice (e.g., a voice associated with the user).

In some implementations, in determining whether the authentication is successful with respect to the remote device, process 700 may involve processor 510 of apparatus 500 performing a number of operations. For instance, process 700 may involve processor 510 of apparatus 500 monitoring a heart rate (e.g., that of the user), analyzing a variation in the heart rate, and determining that the authentication is successful responsive to the variation in the heart rate matching a pre-recorded variation in the heart rate based on a result of the analyzing.

Figure 8:
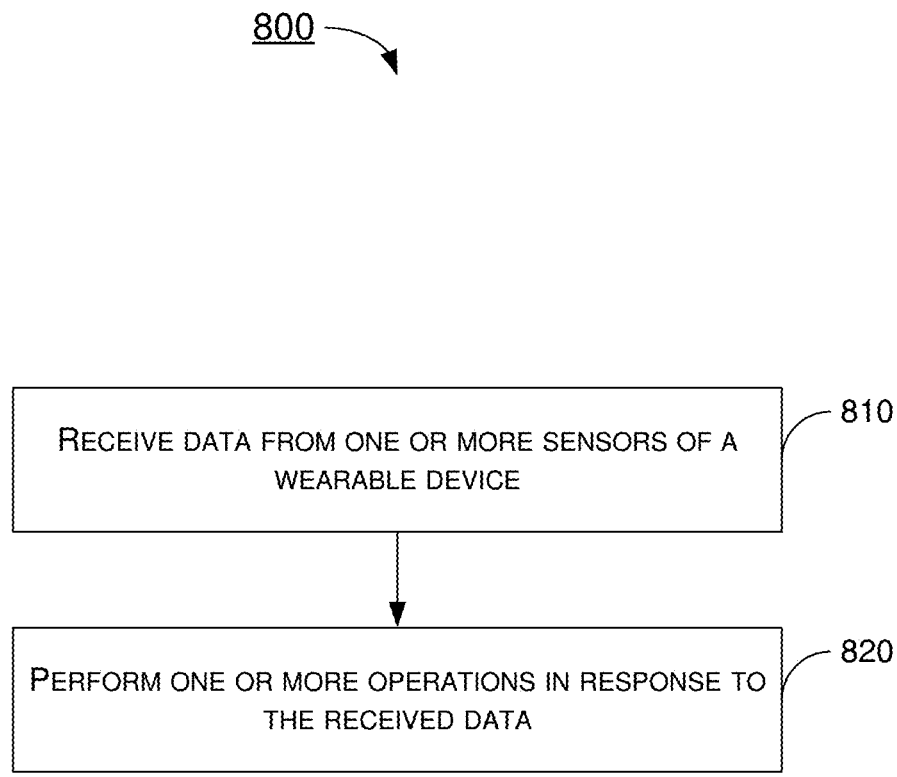
FIG. 8 is a flowchart of an example process in accordance with yet another implementation of the present disclosure.

FIG. 8 illustrates an example process 800 in accordance with yet another implementation of the present disclosure. Process 800 may be an example implementation of algorithm 300. Process 800 may include one or more operations, actions, or functions as represented by one or more blocks such as blocks 810 and 820. Although illustrated as discrete blocks, various blocks of process 800 may be divided into additional blocks, combined into fewer blocks, or eliminated, depending on the desired implementation. The blocks may be performed in the order shown in FIG. 8 or in any other order, depending on the desired implementation. Process 800 may be implemented by apparatus 110 and apparatus 500. Solely for illustrative purpose and without limiting the scope of the present disclosure, process 800 is described below in the context of process 800 being performed by apparatus 500. Process 800 may begin at 810.

At 810, process 800 may involve a wearable device, such as apparatus 500 for example, receiving data from one or more sensors of a wearable device worn by a user. Process 800 may proceed from 810 to 820.

At 820, process 800 may involve apparatus 500 performing one or more operations in response to the received data.

In some implementations, at least one sensor of the one or more sensors of apparatus 500 may include a microphone. In receiving the data from the one or more sensors, process 800 may involve processor 510 of apparatus 500 receiving audible data from the microphone. Accordingly, in performing the one or more operations, process 800 may involve processor 510 of apparatus 500 determining that the audible data comprises a voice command from the user and initiating an authentication process responsive to the voice command.

In some implementations, at least one sensor of the one or more sensors of apparatus 500 may include a gyro sensor. In receiving the data from the one or more sensors, process 800 may involve processor 510 of apparatus 500 receiving gyro data from the gyro sensor. Accordingly, in performing the one or more operations, process 800 may involve processor 510 of apparatus 500 recording the gyro data and transmitting the gyro data to a remote device such that the vibration is reproduced by the remote device.

In some implementations, at least one sensor of the one or more sensors of apparatus 500 may include a thermal sensor. In receiving the data from the one or more sensors, process 800 may involve processor 510 of apparatus 500 receiving thermal data from the thermal sensor. Accordingly, in performing the one or more operations, process 800 may involve processor 510 of apparatus 500 determining a temperature indicated by the thermal data and performing at least one of a variety of tasks. The tasks may include, for example and not limited to, presenting the temperature to the user audibly, visually, or both audibly and visually; transmitting information indicative of the temperature to a remote device; determining whether the temperature exceeds a threshold; and transmitting a warning message to the remote device or presenting a warning message audibly, visually, or both audibly and visually responsive to a determination that the temperature exceeds the threshold.

In some implementations, at least one sensor of the one or more sensors of apparatus 500 may include a pressure sensor. In receiving the data from the one or more sensors, process 800 may involve processor 510 of apparatus 500 receiving pressure data from the thermal sensor. Accordingly, in performing the one or more operations, process 800 may involve processor 510 of apparatus 500 determining an altitude of apparatus 500 based on the pressure data and presenting information indicating the altitude to the user audibly, visually, or both audibly and visually.

In some implementations, at least one sensor of the one or more sensors of apparatus 500 may include one or more ultrasonic transducers. In receiving the data from the one or more sensors, process 800 may involve processor 510 of apparatus 500 receiving ultrasonic data from the one or more ultrasonic transducers. Accordingly, in performing the one or more operations, process 800 may involve processor 510 of apparatus 500 generating a depth map using the ultrasonic data and determining a spatial relationship between an object and the user or between the object and the one or more ultrasonic transducers based at least in part on the depth map.

In some implementations, at least one sensor of the one or more sensors of apparatus 500 may include one or more light sensors. In receiving the data from the one or more sensors, process 800 may involve processor 510 of apparatus 500 receiving lighting data from the one or more light sensors. Accordingly, in performing the one or more operations, process 800 may involve processor 510 of apparatus 500 generating a depth map using the lighting data and determining a spatial relationship between an object and the user or between the object and the one or more light sensors based at least in part on the depth map.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any multiple and/or singular terms herein, those having skill in the art can translate from the multiple to the singular and/or from the singular to the multiple as is appropriate to the context and/or application. The various singular/multiple permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   detecting, by a processor of a wearable device, a presence of a remote device in a vicinity of the wearable device;
   determining, by the processor, whether an authentication is successful with respect to the remote device; and
   triggering, by the processor, the remote device to perform one or more operations responsive to a determination that the authentication is successful with respect to the remote device by wirelessly communicating with the remote device,
   wherein the determining of whether the authentication is successful with respect to the remote device comprises:
      detecting a movement;
      analyzing a path of the movement; and
      determining that the authentication is successful responsive to a result of the analyzing indicating that the path of the movement resembles a predefined pattern indicating that the authentication is successful,
   wherein the detecting of the movement comprises:
      receiving, from an image sensor of the wearable device, data indicative of a movement of the wearable device; and
      recognizing one or more motion vectors through a stream of image frames sensed by the image sensor to identify one or more air gestures performed by the user,
   wherein the performing of the one or more operations comprises:
      obtaining, from one or more image sensors of the wearable device, a visual image of a hand and one or more objects;
      identifying a protrusion from the hand in the visual image;
      determining an object among the one or more objects being pointed by the protrusion; and
      rendering a transaction to purchase another object similar to the object.

2. The method of claim 1, wherein the detecting of the movement further comprises receiving data indicative of a movement of the wearable device from an accelerometer, a gyro sensor, or a combination thereof.

3. The method of claim 1, wherein the determining of whether the authentication is successful with respect to the remote device further comprises:
   receiving a voice command;
   analyzing a voice in the voice command; and
   determining that the authentication is successful responsive to a result of the analyzing indicating the voice in the voice command being recognized as a prerecorded voice.

4. The method of claim 1, wherein the determining of whether the authentication is successful with respect to the remote device further comprises:
monitoring a heart rate;
analyzing a variation in the heart rate; and
determining that the authentication is successful responsive to the variation in the heart rate matching a pre-recorded variation in the heart rate based on a result of the analyzing.

5. A method, comprising:
receiving, by a processor of a wearable device, data from one or more sensors of the wearable device;
determining, by the processor, whether an authentication is successful with respect to the wearable device; and
performing, by the processor responsive to a determination that the authentication is successful, one or more operations in response to the received data,
wherein the one or more sensors comprise at least one image sensor,
wherein the one or more operations comprise either or both of:
 detecting an air gesture performed by a user of the wearable device represented by a movement of the wearable device based on one or more motion vectors indicated in a stream of image frames sensed by the at least one image sensor; and
 rendering a transaction to purchase an object similar to another object in a visual image sensed by the at least one image sensor, and
wherein the determining of whether the authentication is successful with respect to the wearable device comprises:
 detecting a movement;
 analyzing a path of the movement; and
 determining that the authentication is successful responsive to a result of the analyzing indicating that the path of the movement resembles a predefined pattern indicating that the authentication is successful.

6. The method of claim 5, wherein at least one sensor of the one or more sensors further comprises a microphone, wherein the receiving of the data from the one or more sensors comprises receiving audible data from the microphone, and wherein the performing of the one or more operations comprises:
determining that the audible data comprises a voice command; and
initiating an authentication process responsive to the voice command.

7. The method of claim 5, wherein at least one sensor of the one or more sensors further comprises a gyro sensor, wherein the receiving of the data from the one or more sensors comprises receiving gyro data indicative of a vibration sensed by the gyro sensor, and wherein the performing of the one or more operations comprises:
recording the gyro data; and
transmitting the gyro data to a remote device such that the vibration is reproduced by the remote device.

8. The method of claim 5, wherein at least one sensor of the one or more sensors further comprises a thermal sensor, wherein the receiving of the data from the one or more sensors comprises receiving thermal data from the thermal sensor, and wherein the performing of the one or more operations comprises:
determining a temperature indicated by the thermal data; and
performing at least one of a plurality of tasks, the plurality of tasks comprising:
 presenting the temperature audibly, visually, or both audibly and visually;
 transmitting information indicative of the temperature to a remote device;
 determining whether the temperature exceeds a threshold; and
 transmitting a warning message to the remote device or presenting a warning message audibly, visually, or both audibly and visually responsive to a determination that the temperature exceeds the threshold.

9. The method of claim 5, wherein at least one sensor of the one or more sensors further comprises a pressure sensor, wherein the receiving of the data from the one or more sensors comprises receiving pressure data from the pressure sensor, and wherein the performing of the one or more operations comprises:
determining an altitude of the wearable device based on the pressure data; and
presenting information indicating the altitude audibly, visually, or both audibly and visually.

10. The method of claim 5, wherein at least one sensor of the one or more sensors further comprises one or more ultrasonic transducers, wherein the receiving of the data from the one or more sensors comprises receiving ultrasonic data from the one or more ultrasonic transducers, and wherein the performing of the one or more operations comprises:
generating a depth map using the ultrasonic data; and
determining a spatial relationship between an object and the one or more ultrasonic transducers based at least in part on the depth map.

11. The method of claim 5, wherein at least one sensor of the one or more sensors further comprises one or more light sensors, wherein the receiving of the data from the one or more sensors comprises receiving lighting data from the one or more light sensors, and wherein the performing of the one or more operations comprises:
generating a depth map using the lighting data; and
determining a spatial relationship between an object and the one or more light sensors based at least in part on the depth map.

12. An apparatus, comprising:
one or more sensors comprising at least one image sensor; and
a processor coupled to receive sensor data from the one or more sensors, the processor configured to perform operations comprising:
 detecting an air gesture performed by a user of the apparatus represented by a movement of the apparatus based on one or more motion vectors indicated in a stream of image frames sensed by the at least one image sensor;
 determining whether an authentication is successful with respect to the movement; and
 performing one or more operations responsive to a determination that the authentication is successful,
wherein the performing of the one or more operations comprises:
 obtaining, from the at least one image sensor, a visual image of a hand and one or more objects;
 identifying a protrusion from the hand in the visual image;
 determining an object among the one or more objects being pointed by the protrusion; and rendering a transaction to purchase another object similar to the object, and wherein the determining of whether the authentication is successful with respect to the movement comprises:
analyzing a path of the movement; and
determining that the authentication is successful responsive to a result of the analyzing indicating that the path of the movement resembles a predefined pattern indicating that the authentication is successful.

13. The apparatus of claim 12, wherein the one or more sensors comprise one or more optical image sensors, one or more accelerometers, one or more gyro sensors, or a combination thereof.

14. The apparatus of claim 12, wherein, in determining whether the path of the movement corresponds to the one or more predefined patterns, the processor is configured to determine that the path of the movement resembles one of the one or more predefined patterns corresponding to a first predefined command.

15. The apparatus of claim 12, wherein the processor is configured to further perform operations comprising:
detecting a presence of an authentication device; and
initiating an authentication process with the authentication device.

16. The apparatus of claim 12, wherein the processor is configured to further perform operations comprising:
detecting another movement;
determining that a path of the another movement corresponds to a second predefined command; and
aborting the one or more operations being performed on the apparatus according to the second predefined command.

17. The apparatus of claim 12, wherein, in performing the one or more operations, the processor is also configured to search information related to the object and present the searched information related to the object.

18. The apparatus of claim 12, wherein the one or more predefined patterns comprise one or more alphabets, one or more symbols, one or more numbers, one or more characters, or a combination thereof, and wherein, in performing the one or more operations, the processor is configured to perform operations comprising:
identifying one or more alphabets, symbols, numbers, or characters corresponding to the path of the movement; and
recording the one or more alphabets, symbols, numbers, or characters in a memo.

19. The apparatus of claim 12, wherein the one or more predefined patterns comprise one or more predefined commands, and wherein, in performing the one or more operations, the processor is configured to perform operations comprising:
identifying one command of the one or more predefined commands corresponding to the path of the movement; and
performing a task corresponding to the one command with the wearable device.

20. The apparatus of claim 19, wherein the task comprises:
initiating an authentication process; and
triggering a first electronic device to transfer textual data, audio data, video data, or a combination thereof to a second electronic device responsive to a result of the authentication process indicating that the authentication process is successful.

21. The apparatus of claim 19, wherein the task comprises:
triggering a first electronic device or a camera on the wearable device to capture a still image or a video with the; and
triggering the first electronic device or the wearable device to transfer the still image or video to a second electronic device.

22. The apparatus of claim 12, wherein the processor is configured to further perform operations comprising:
detecting a presence of a remote device;
determining whether the authentication process is successful with respect to the remote device; and
triggering the remote device to perform one or more operations responsive to a determination that the authentication process is successful with respect to the remote device.

23. The apparatus of claim 22, wherein, in determining whether the authentication process is successful with respect to the remote device, the processor is configured to determine that the authentication process is successful responsive to a result of the path of the movement corresponding to one of the one or more predefined patterns indicating that the authentication process is successful.

24. The apparatus of claim 22, wherein, in determining whether the authentication process is successful with respect to the remote device, the processor is configured to perform operations comprising:
receiving a voice command through the one or more sensors;
analyzing a voice in the voice command; and
determining that the user is authenticated responsive to a result of the analyzing indicating the voice in the voice command being recognized as a prerecorded voice.

25. The apparatus of claim 22, wherein, in determining whether the authentication process is successful with respect to the remote device, the processor is configured to perform operations comprising:
monitoring a heart rate based on the data from the one or more sensors;
analyzing a variation in the heart rate; and
determining that the authentication process is successful responsive to the variation in the heart rate matching a pre-recorded variation in the heart rate based on a result of the analyzing.

26. The apparatus of claim 12, wherein at least one sensor of the one or more sensors comprises a microphone configured to provide to the processor audible data indicative of a voice command received by the microphone, and wherein, in performing the one or more operations, the processor is configured to initiate an authentication process responsive to the voice command.

27. The apparatus of claim 12, wherein at least one sensor of the one or more sensors comprises a gyro sensor configured to provide to the processor gyro data indicative of a vibration sensed by the gyro sensor, and wherein, in performing the one or more operations, the processor is configured to perform operations comprising:
recording the gyro data; and
transmitting the gyro data to a remote device such that the vibration is reproduced by the remote device.

28. The apparatus of claim 12, wherein at least one sensor of the one or more sensors comprises a thermal sensor configured to provide to the processor thermal data indicative of a temperature sensed by the thermal sensor, and wherein, in performing the one or more operations, the processor is configured to perform at least one of a plurality of tasks, the plurality of tasks comprising:

presenting the temperature audibly, visually, or both audibly and visually;

transmitting information indicative of the temperature to a remote device;

determining whether the temperature exceeds a threshold; and transmitting a warning message to the remote device or presenting a warning message audibly, visually, or both audibly and visually responsive to a determination that the temperature exceeds the threshold.

29. The apparatus of claim 12, wherein at least one sensor of the one or more sensors comprises a pressure sensor configured to provide to the processor pressure data indicative of a pressure sensed by the pressure sensor, and wherein, in performing the one or more operations, the processor is configured to perform operations comprising:

determining an altitude of the wearable device based on the pressure; and presenting information indicating the altitude audibly, visually, or both audibly and visually.

30. The apparatus of claim 12, wherein at least one sensor of the one or more sensors comprises one or more ultrasonic transducers configured to provide to the processor ultrasonic data indicative of ultrasonic waves sensed by the one or more ultrasonic transducers, and wherein, in performing the one or more operations, the processor is configured to perform operations comprising:

generating a depth map using the ultrasonic data; and determining a spatial relationship between an object and the one or more ultrasonic transducers based at least in part on the depth map.

31. The apparatus of claim 12, wherein at least one sensor of the one or more sensors comprises one or more light sensors configured to provide to the processor lighting data indicative of ambient lighting sensed by the one or more light sensors, and wherein, in performing the one or more operations, the processor is configured to perform operations comprising:

generating a depth map using the lighting data; and determining a spatial relationship between an object and the one or more light sensors based at least in part on the depth map.

* * * * *